US007042356B2

(12) United States Patent
Kent

(10) Patent No.: US 7,042,356 B2
(45) Date of Patent: May 9, 2006

(54) EQUIPMENT MONITORING METHOD AND APPARATUS

(75) Inventor: John B Kent, Nr Olney (GB)

(73) Assignee: Traka Limited, Olney (GB)

( * ) Notice: Subject to any disclaimer, the term of this patent is extended or adjusted under 35 U.S.C. 154(b) by 231 days.

(21) Appl. No.: 10/240,011

(22) PCT Filed: Mar. 23, 2001

(86) PCT No.: PCT/GB01/01311

§ 371 (c)(1),
(2), (4) Date: Feb. 3, 2003

(87) PCT Pub. No.: WO01/75811

PCT Pub. Date: Oct. 11, 2001

(65) Prior Publication Data

US 2003/0151494 A1 Aug. 14, 2003

(30) Foreign Application Priority Data

Mar. 31, 2000 (GB) .................................... 0007857

(51) Int. Cl.
*B08B 13/14* (2006.01)
*B06R 25/00* (2006.01)
*G05B 19/00* (2006.01)
*G06F 7/00* (2006.01)
*H04B 1/00* (2006.01)

(52) U.S. Cl. .............................. 340/568.1; 340/572.1; 340/5.73; 235/381; 235/382

(58) Field of Classification Search ............ 340/568.1, 340/572.1, 5.73, 568.7, 825.31, 572.8, 426.35, 340/539.1, 5.42, 5.5, 5.92, 7.52; 235/381, 235/375
See application file for complete search history.

(56) References Cited

U.S. PATENT DOCUMENTS 4,635,053 A 1/1987 Banks et al. ........... 340/825.31
5,726,885 A 3/1998 Klein et al. ........... 364/423.098
5,838,251 A * 11/1998 Brinkmeyer et al. ....... 340/5.22
5,936,527 A * 8/1999 Isaacman et al. ........ 340/572.1
5,942,978 A * 8/1999 Shafer ..................... 340/572.9
6,131,808 A * 10/2000 Pires et al. ................. 235/375
6,160,488 A * 12/2000 Honda ....................... 340/5.65

FOREIGN PATENT DOCUMENTS

DE 41 36 734 A1 7/1993
EP 0 833 283 A2 1/1998
EP 1 006 490 A2 6/2000
FR 2 662 285 A1 11/1991
FR 2 760 557 A1 9/1998

* cited by examiner

*Primary Examiner*—Michael Horabik
*Assistant Examiner*—Nam Nguyen
(74) *Attorney, Agent, or Firm*—Renner Kenner Greive Bobak Taylor & Weber

(57) ABSTRACT

A system for controlling and monitoring usage of equipment comprises an electronic key for controlling operation of the equipment and a central storage location for a plurality of keys. Access to the keys is controlled so that only authorized personnel can obtain a key and may be directed to select a particular key. In any event, the key is associated with a particular authorized person. At the equipment, the key is inserted and data contained in the key is read and the equipment enabled under microprocessor control. Data relating to the activity of the equipment can be written to circuitry in the key for transfer back to the central storage location when the key is returned.

10 Claims, 2 Drawing Sheets

EQUIPMENT MONITORING METHOD AND APPARATUS

The present invention relates to a method, apparatus and devices for monitoring the use of equipment.

There have been many prior proposals for monitoring the use of equipment and it will be appreciated that the equipment can take any one of a number of forms from office equipment such as photocopiers through to motor vehicles. For simplicity, we will concentrate on the monitoring of vehicles but this is merely one example of the uses to which the present invention may be put.

We have already proposed a system for monitoring usage of motor vehicles wherein the ignition or door key is attached to a special intelligent key fob which works rather like a large jack plug. The key is attached to the special key fob using a standard key ring or, where added security is required, security seals. It is the special key fob that is monitored, the key fobs to which the keys are attached are stored in a special cabinet and a key can only be removed from the cabinet by an individual identifying himself to computer equipment associated with the cabinet. When an individual gains access to the cabinet, it is his responsibility to take the key and return it after use. The computer equipment associated with the cabinet can therefore keep a track of the usage of the key, attached to the key fob. A similar system is disclosed in WO95/04324.

While the above system works well, there are some situations where we have found that modification to the basic apparatus is required and this is perhaps best illustrated by the example of premises where a large number of identical vehicles are in use eg fork lift trucks. There are a limited number of different mechanical keys which are in use in such a situation and this means that the same key may fit more than one vehicle. Also, in many situations users may be permitted to utilise any vehicle which is not currently in use and this combination of factors makes usage of the vehicles complicated to monitor with the existing equipment. Also, it is necessary for each individual vehicle to store a log of its usage which may be required in order to perform routine maintenance, and for each vehicle to be periodically inspected so that its log can be downloaded.

The present invention proposes an arrangement whereby keys for operating equipment can be identical physically (mechanically) but electrically can be differentiated one from the other. Additionally, the keys are arranged so as to be able to store information transferred to them by the equipment with which they are used for subsequent transfer to a centralised computer system when the keys are returned to their storage location. Preferably, the information is transferred to the storage location and subsequently to the centralised computer system.

In the preferred embodiment of the present invention, the previous key fobs are modified so that they need not have a mechanical key attached to them but they themselves form the key for the equipment. Additionally, they can temporarily store data derived by the equipment. Further, they can temporarily store data derived by the storage location in order to control usage of the key and/or the equipment.

In order that the present invention be more readily understood, an embodiment thereof will now be described by way of example only with reference to the accompanying drawings in which.

Figure 1:
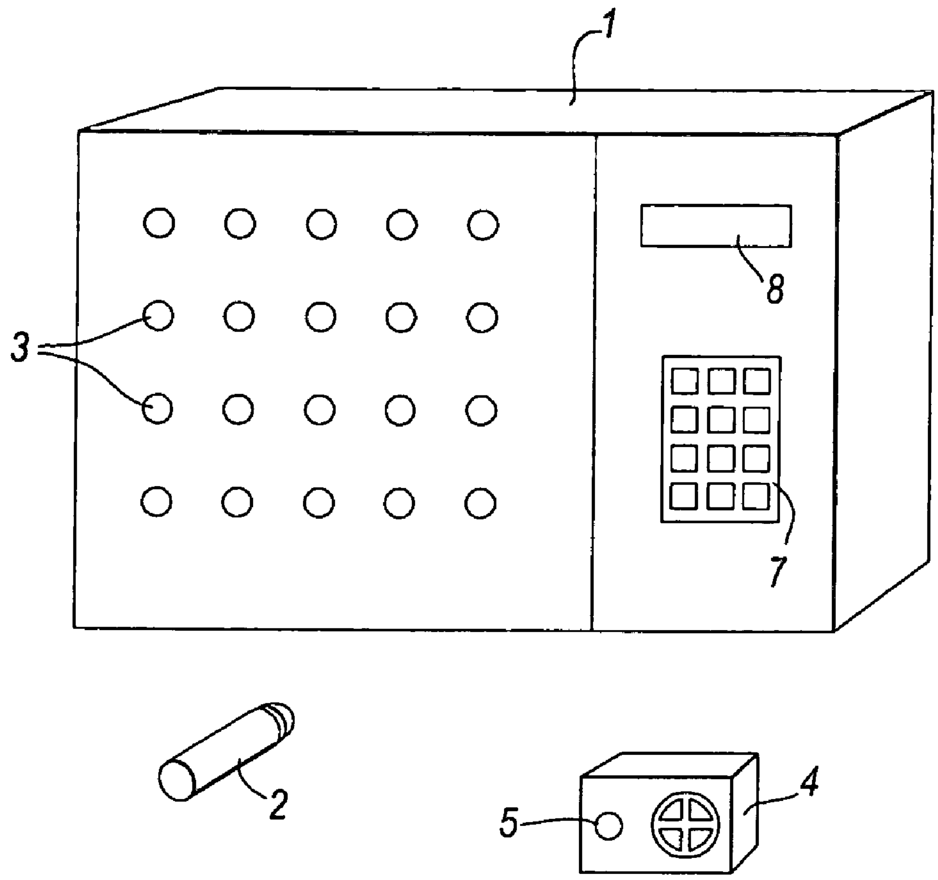
FIG. 1 shows a perspective view of a storage location used with the present invention.

In the preferred embodiment, it is assumed that a large number of pieces of identical equipment are used or alternatively a few pieces of equipment are required to be used by a large number of users and in either case it is wished to monitor and control the usage of the equipment and/or allocate usage to individuals as well as monitor total usage.

The preferred embodiment of the present invention is a system having three major components namely a central storage location 1, a plurality of activation devices which will be coded keys 2 which are arranged to be stored in key slots 3 at the storage location 1, and remote stations 4 arranged to be activated under the control of a microprocessor when a key 2 is inserted in a key slot 5 at the remote station 4.

The keys, at least the portion inserted in a key slot, are all physically identical but contain electrical circuitry which distinguishes one from the other. This means that the remote stations 4 must have a microprocessor for determining the individual key inserted in its key slot 5 and means for controlling the operation of the remote station in accordance with a program determined beforehand and dictated by the identity of the key. The circuitry also has means for transferring data from the remote station to a key when a key 2 is present in the key slot 5.

The structure and function of each of the three major components will now be described in more detail commencing firstly with the central storage location 1. As mentioned above, the central storage location contains a number of key slots 3 for retaining the keys 2. In this embodiment, the keys are physically retained in the key slots 3 but can be individually released under microprocessor control when a user correctly identifies himself to the microprocessor utilising a key pad 7 or card reader 8 or some other form of identification means. This retention of keys is not essential in view of the fact that the cabinet may be fitted with a door which is only operable after a user has correctly identified himself. In this case, the key removed is associated with the user opening the door. The microprocessor is arranged to store information relating to each user and this information can include information relating to the type of equipment which can be operated by the user as well as other information such as time of day or duration of allowed usage. At least the portion of each key located within the slot is physically identical to each other key but each key has electronic memory means such that the keys can be rendered unique or placed in hierarchical groups. This can be achieved by either using a combination of permanently stored data or by dynamically loading appropriate data onto a key utilising the microprocessor at the central storage location 1. In either event, the microprocessor can monitor and log which user has been allocated a particular key and indeed the user can be directed to take the specific key which has been allocated to him by the central computer. This may be by way of any convenient indication such as a light associated with each key slot being illuminated or by identifying a particular key using a display.

Figure 2:
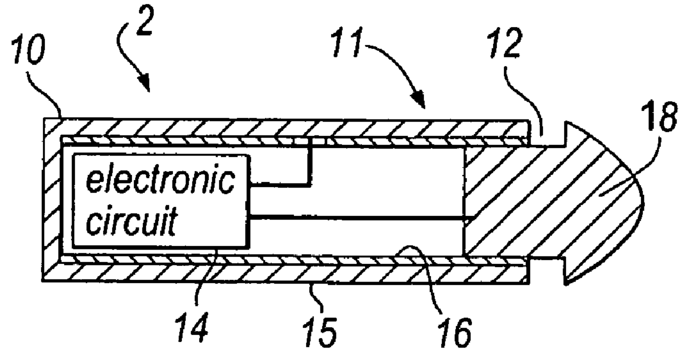
FIG. 2 shows diagrammatically a key according to the present invention.

Referring now to FIG. 2, this shows a diagrammatic representation of a key 2 according to the present invention. The key 2 can take any one of a number of forms but in the present case is shown to comprise a manually engagable portion 10 and an actuation portion 11. The actuation portion is shown to be somewhat similar to a jack plug, when viewed from the side, in view of the fact that it is generally cylindrical and has a retaining annular recess 12 near its free end. The actuation portion of each key will be identical so that any key may potentially operate the or each piece of equipment. However, the keys are differentiated one from the other by virtue of being provided with electronic circuitry 14 which will enable one or a number of functions. Among these functions is identifying the key uniquely. To this end, the electronic circuitry comprises a data store which has a read only memory portion for storing the unique identity of the key. The chip concerned is preferably a Dallas DS2401. The circuitry may also have a re-writable memory portion for storing additional information for example about the user, the type of equipment to be used or the time and number of users permitted or a combination. The preferred circuitry is an E2 PROM which may be a Dallas DS2430a device. A similar chip containing flash memory could also be used. In this way, the keys can be reprogrammed as desired or certain keys and hence users can be given additional facilities or certain facilities can be restricted to only certain users.

The key 2 shown in FIG. 2 comprises a metal outer sleeve 15, at least a portion of the internal bore of which is electrically insulated by suitable material 16. A metal tip 18 fits into the open end of the sleeve 15 and is shaped to form the recess 12 by being spaced from the end of the sleeve. This end of the sleeve is preferably insulated so as to prevent a short circuit between the sleeve and tip. The circuitry 14 has connections to the sleeve 15 and tip 18 to enable interrogation of and/or writing of information to the circuitry.

The key 2 can simply be one part of an electronic immobilising system and in order to operate the equipment a separate starter may need to operated with the key inserted. Physically turning the key is not necessary hence the key looks much more like a conventional jack plug with a circular cross-section.

In use, and as mentioned above, an operator will identify himself to a central location eg the cabinet 1 and be allowed access to the keys. The keys are physically identical to each other but electrically unique because of the data in the chip. The user then either selects a key or is directed to a specific key and removes it from the central location. Because each key has a unique identity, the central location is able to correlate the user with the key, removed from the cabinet.

The third major component of the system, the remote stations will now be described.

The operator goes to the remote location and inserts the key into the equipment. The key is electrically identified as being correct for the vehicle concerned as will now be described in relation to FIG. 3 which shows a block diagram of the electrical apparatus required in the equipment in order for the key shown in FIG. 2 to be used. The key 2 is designed to be received in a key receptacle 20 and this will enable the vehicle to be operated as indicated by block 22 since the equipment has recognised using a local microprocessor 21 that a suitable key has been placed in the key receptacle. The microprocessor 21 is arranged to control the remote station activity in accordance with a stored program which can be one of a number stored in a program store 25. The exact program carried out may be dependent on the identity of the key.

It is also possible to provide over-ride functions so that a master key can be inserted and the equipment microprocessor signalled by data in the master key to accept the next key if it is inserted within a predetermined time. This would provide management control of the equipment. The override function could be provided by interpretation of data contained in the key either alone or in combination with a timer 23 so that the over-ride can time out. This system thus allows proper control and logging of who is driving which truck without the inconvenience associated with loss or damage to conventional keys.

Figure 3:
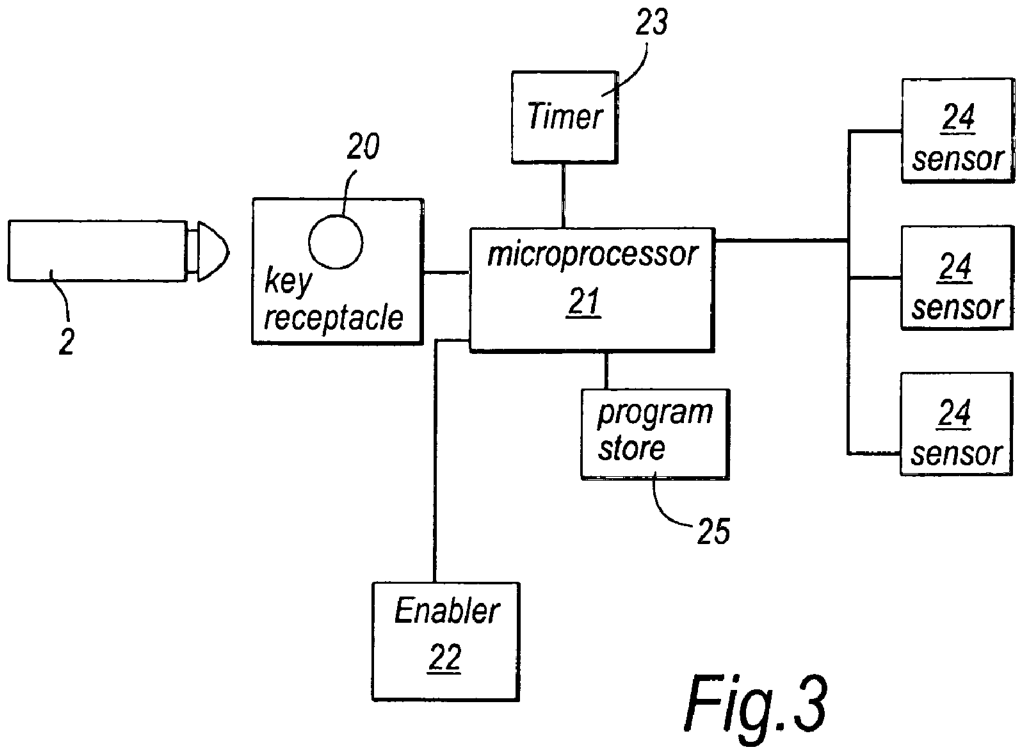
FIG. 3 shows a block diagram of the electrical circuitry associated with a key in a piece of equipment.

Additionally, the remote station may be provided with means for transferring data collected from usage of the vehicle. In this case, the data is shown in FIG. 3 as being derived from a plurality of sensors 24 which are fed individually via the local microprocessor 21 to the memory device 14 in the key at appropriate times. The data relating to the equipment preferably includes a unique indication of the piece of equipment being used and information relating to the activity of the vehicle such as an indication of the amount of time the equipment has been in use. Data is transferred to the key 2 via contacts shown in FIG. 2. Where the data relating to the equipment includes a unique identification of the piece of equipment being used, it is possible to provide a system whereby any key can be used in any piece of equipment while still keeping an accurate complete log of which person has utilised which equipment and for how long.

Figure 4:
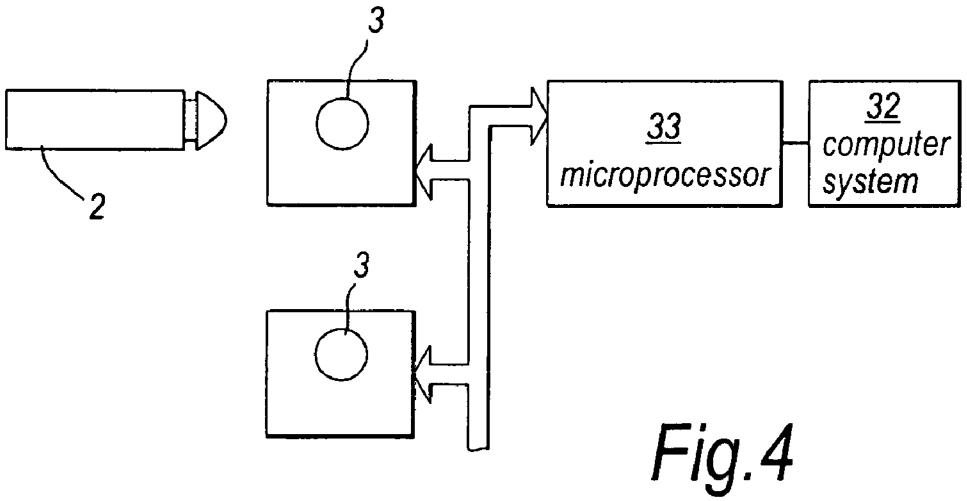
FIG. 4 shows a block diagram of the electrical arrangement at the key storage location.

Once the key 2 has been removed from the receptacle 20, it is then taken by the operator and replaced in the key storage location as indicated by the storage slot 3 in FIG. 4. The slot 3 is connected to the microprocessor 33 which downloads the data stored in the key 2 including the identity of the key. This data is stored in the key storage location until such time as it is transferred to a computer system 32 for analysis.

A number of modifications may be made to the above described key and/or system. For example, the actuation part of the key may look like a conventional key or the equipment may have a sophisticated electronic lock and/or security system fitted to it so that only selected groups of keys will operate the equipment in order to prevent keys from a different location being used.

What is claimed is:

1. A system for monitoring usage of a plurality of pieces of remote apparatus each of which is provided with electronic control means for controlling activation of the apparatus, the system comprising a plurality of portable activation devices for use with the pieces of remote apparatus and a central storage means for retaining the portable activation devices when not in use, wherein each activation device is provided with a mechanical portion and an electronic portion, the mechanical portions of the activation devices being identical and the electrical portions having means for storing data identifying the device, wherein the electronic control means of each of the pieces of remote apparatus includes means for reading data stored in the activation device when present and means for writing information including the identity of the remote apparatus into the electronic portion of the activation device and wherein the central storage means has a plurality of receptacles each for receiving the mechanical portion of a respective portable activation device and has means for monitoring the presence of the activation devices in the receptacles and for reading data stored in such activation devices so as to identify the removal and return of a specific activation device from or to a particular slot as well as the identity of the remote apparatus used in order to monitor usage of the remote apparatus used.

2. A system according to claim 1, wherein the electronic control means includes data collection means for collecting characteristic of usage of the remote apparatus and means for transferring collected data to the activation device when present.

3. A system according to claim 1, wherein the electronic control means is connected to a receptacle for receiving the activation device, the receptacle being responsive to the presence of the activating device in order to provide a first signal to the control means.

4. A system according to claim 1, wherein the central storage means includes means for transferring data between a central computing device and each activating device when present at the central storage means.

5. A system according to claim 1 characterized in that at least one of the activation devices contains data which indicates to the electronic control means to accept, within a predetermined time, the next activation device received by the receptacle following the removal of the said at least one activation device.

6. A system for monitoring usage of a piece of remote apparatus which is provided with electronic control means for controlling activation of the apparatus, the system comprising a plurality of portable activation devices for use with the piece of remote apparatus and a storage means for retaining the portable activation devices when not in use, wherein each activation device is provided with a mechanical portion and an electronic portion, the mechanical portions of the activation devices being identical and the electrical portions having means for storing data identifying the device, wherein the electronic control means of the piece of remote apparatus includes means for reading data stored in the activation device when present and means for writing information into the electronic portion of the activation device and wherein the storage means has a plurality of receptacles each for receiving the mechanical portion of a respective portable activation device and has means for monitoring the presence of the activation devices in the receptacles and for reading data stored in such activation devices so as to identify the removal and return of a specific activation device in order to monitor usage of the remote apparatus.

7. A system according to claim 6, wherein the electronic control means includes data collection means for collecting characteristic of usage of the remote apparatus and means for transferring collected data to the activation device when present.

8. A system according to claim 6, wherein the electronic control means is connected to a receptacle for receiving the activation device, the receptacle being responsive to the presence of the activating device in order to provide a first signal to the control means.

9. A system according to claim 6, wherein the storage means includes means for transferring data between a computing device and each activating device when present at the storage means.

10. A system according to claim 6 characterized in that at least one of the activation devices contains data which indicates to the electronic control means to accept, within a predetermined time, the next activation device received by the receptacle following the removal of the said at least one activation device.

* * * * *